United States Patent
Lan et al.

(10) Patent No.: US 9,581,772 B2
(45) Date of Patent: Feb. 28, 2017

(54) OPTICAL ELECTRICAL MODULE USED FOR OPTICAL COMMUNICATION

(71) Applicant: Centera Photonics Inc., Hsinchu (TW)

(72) Inventors: Hsiao-Chin Lan, New Taipei (TW); Shang-Jen Yu, Hsinchu County (TW)

(73) Assignee: Centera Photonics Inc., Hsinchu (TW)

( * ) Notice: Subject to any disclaimer, the term of this patent is extended or adjusted under 35 U.S.C. 154(b) by 137 days.

(21) Appl. No.: 14/505,512

(22) Filed: Oct. 3, 2014

(65) Prior Publication Data
US 2015/0023632 A1    Jan. 22, 2015

Related U.S. Application Data

(63) Continuation-in-part of application No. 13/423,259, filed on Mar. 18, 2012, now abandoned.

(30) Foreign Application Priority Data

Sep. 9, 2011    (TW) ............... 100132684 A
Sep. 9, 2011    (TW) ............... 100132687 A
Oct. 21, 2011   (TW) ............... 100138390 A

(51) Int. Cl.
*G02B 6/42*    (2006.01)

(52) U.S. Cl.
CPC ......... *G02B 6/4214* (2013.01); *G02B 6/4274* (2013.01); *G02B 6/4212* (2013.01); *G02B 6/4249* (2013.01)

(58) Field of Classification Search
CPC .......... G01J 1/04; G01J 1/4228; G01J 1/0403; G02B 6/42; H01L 31/0203;
(Continued)

(56) References Cited

U.S. PATENT DOCUMENTS 4,897,711 A * 1/1990 Blonder ............... G02B 6/4214
257/432
6,132,107 A   10/2000 Morikawa
(Continued)

FOREIGN PATENT DOCUMENTS

CN    1318869    5/2007
CN    101017228  8/2007
(Continued)

OTHER PUBLICATIONS

"Office Action of China Counterpart Application", issued on Aug. 16, 2013, p. 1-p. 14.
(Continued)

*Primary Examiner* — Tony Ko
(74) *Attorney, Agent, or Firm* — Jianq Chyun IP Office

(57) ABSTRACT

An optical electrical module includes a first substrate, a second substrate, a bearing portion and at least one optical electrical element. The second substrate is combined with the first substrate and has a reflective surface facing the first substrate. The bearing portion is disposed between the first substrate and the second substrate to limit at least one light guide element. The optical electrical element is disposed on a surface of the first substrate facing the reflective surface and faces the reflective surface. The optical electrical element is configured for providing or receiving light signals. The reflective surface and the light guide element are disposed on an optical path of the light signals.

11 Claims, 13 Drawing Sheets

(58) Field of Classification Search
CPC ........... H01L 27/14618; H01L 31/0232; H01L 27/14625; H04N 5/2253
See application file for complete search history.

(56) References Cited

U.S. PATENT DOCUMENTS

| | | |
|---|---|---|
| 6,859,229 B1 | 2/2005 | Suda |
| 6,952,514 B2 | 10/2005 | Lee et al. |
| 7,058,266 B2 | 6/2006 | Arakida et al. |
| 7,355,166 B2 | 4/2008 | Sherrer et al. |
| 7,378,646 B2 | 5/2008 | Sherrer |
| 8,439,578 B2 | 5/2013 | Kropp |
| 2004/0101020 A1 | 5/2004 | Bhandarkar |
| 2007/0183724 A1 | 8/2007 | Sato |

FOREIGN PATENT DOCUMENTS

| | | |
|---|---|---|
| CN | 101354462 | 1/2009 |
| JP | 2003167175 | 6/2003 |
| JP | 2007121973 | 5/2007 |
| JP | 2007334166 | 12/2007 |
| TW | M297101 | 9/2006 |
| TW | 201129834 | 9/2011 |

OTHER PUBLICATIONS

"Office Action of Taiwan Counterpart Application", issued on Nov. 7, 2013, p. 1-p. 7.

"Office Action of Taiwan Counterpart Application", issued on Nov. 19, 2013, p. 1-p. 4.

"Office Action of Taiwan Counterpart Application", issued on Dec. 5, 2013, p. 1-p. 7.

"Office Action of China Counterpart Application", issued on Jan. 14, 2014, p. 1-p. 13.

"Office Action of Taiwan Counterpart Application", issued on Apr. 3, 2014, p. 1-p. 5.

* cited by examiner

OPTICAL ELECTRICAL MODULE USED FOR OPTICAL COMMUNICATION

CROSS-REFERENCE TO RELATED APPLICATION

This application is a continuation-in-part application of and claims the priority benefit of a prior application Ser. No. 13/423,259, filed on Mar. 18, 2012, now pending. The prior application Ser. No. 13/423,259 claims the priority benefit of Taiwan application serial no. 100132684, filed on Sep. 9, 2011, Taiwan application serial no. 100132687, filed on Sep. 9, 2011 and Taiwan application serial no. 100138390, filed on Oct. 21, 2011. The entirety of each of the above-mentioned patent applications is hereby incorporated by reference herein and made a part of this specification.

BACKGROUND OF THE INVENTION

Field of the Invention

The invention relates to an optical electrical module. Particularly, the invention relates to an optical electrical module used for optical communication.

Description of Related Art

In a field of optical communication, a signal transmitter uses an optical electrical module that serves as a signal transmitting element to convert an electric signal into an optical signal, and a signal receiver uses the optical electrical module that serves as a signal receiving element to convert the received optical signal into the electric signal. Therefore, the optical electrical module is an indispensable device in the field of optical communication.

FIG. 1 is a schematic diagram of a conventional optical electrical module. Referring to FIG. 1, the conventional optical electrical module 100 is used to provide a light signal, and includes a circuit board 110, a base 120, a light-emitting element 130, an optical fiber 140 and a chip 150. The base 120 and the chip 150 are disposed on the circuit board 110, and the chip 150 is electrically connected to the circuit board 110 through a bonding wire 162. The base 120 has surfaces 122 and 123 parallel to a bottom surface 121 thereof. A reflective surface 124 of the base 120 is connected to the surfaces 122 and 123 and located between the surfaces 122 and 123, and tilts a predetermined angle relative to the surface 123. The light-emitting element 130 is disposed on a pad 125 on the surface 122, and is electrically connected to the chip 150 through the pad 125 and a bonding wire 164. A part of the light-emitting element 130 protrudes out of the pad 125 and faces the reflective surface 124. The optical fiber 140 is disposed on the surface 123 of the base 120.

The chip 150 is adapted to control the light-emitting element 130 to emit a corresponding light signal 132 according to information to be transmitted, and the reflective surface 124 reflects the light signal 132 into the optical fiber 140 for transmitting the light signal. 132 through the optical fiber 140. Moreover, a signal receiver can use another optical electrical module to receive the light signal 132 transmitted by the optical fiber 140. The optical electrical module used for receiving the light signal 132 is similar to the optical electrical module 100, and a difference there between is that the light-emitting element 130 is replaced by a light-receiving element.

In the conventional optical electrical module 100, since a part of the light-emitting element 130 protrudes out of the pad 125 to facilitate providing the light signal 132 to the reflective surface 124, a contact area between the light-emitting element 130 and the pad 125 is relatively small. Therefore, the light-emitting element 130 can easily fall off, which leads to poor reliability of the optical electrical module 100. Similarly, the conventional optical electrical module used for receiving the light signal also has the problem that the light-receiving element can easily fall off.

Packaging of the optical device is one of key techniques that influence a yield and a cost of the optical electrical element and the optical electrical module. Referring to FIG. 2, FIG. 2 is a schematic diagram of a package structure of another optical electrical module according to the conventional technique. The optical electrical module 100A includes a circuit board 101, a light-emitting/receiving element 103, an optical fiber 104 (which is also referred to as waveguide), a substrate 102 and a cover plate 106. The substrate 102 is disposed on the circuit board 101. The light-emitting/receiving element 103 is disposed on the substrate 102. The optical fiber 104 used for transmitting a light signal 105 is disposed on the substrate 102. The light signal 105 can be transmitted to the light-emitting/receiving element 103 through a reflective surface 102a of the substrate 102.

Since the optical fiber 104, the reflective surface 102a and the light-emitting/receiving element 103 have to be accurately aligned, a microscope is used with assistance of a special tool to adjust a position of the cover plate 106, so as to fix the optical fiber 104 on the substrate 102, and then follow-up packaging steps are performed. Such practice requires a highly skilled worker, which not only has a high cost, but also has low process robustness. Therefore, an advanced fixing module is required to be provided to facilitate the packaging process of the optical device and ameliorate the process robustness and yield.

FIG. 3 is a partial cross-sectional view of an optical electrical module of a conventional technique that is used for sending a light signal, and FIG. 4 is a three-dimensional exploded view of a substrate and an optical fiber of FIG. 3. Referring to FIG. 3 and FIG. 4, the conventional optical electrical module 100B includes a substrate 110B, a plurality of light-emitting element 120B and a plurality of optical fibers 130B. The substrate 110B has a plurality of strip grooves 112B parallel to each other, and the strip grooves 112B, for example, extend along a straight-line direction D. Each of the optical fibers 130B is disposed in a corresponding strip groove 112B. Moreover, each of the light-emitting elements 120B is used for providing a light signal, and in FIG. 3, a referential number 122B is used to represent an optical axis of the light signal. The light signal enters the optical fiber 130B through a light-incident surface 132B of the optical fiber 130B, and the optical axis 122B of the light signal transmitted to the light-incident surface 132B is parallel to the strip grooves 112B and the straight-line direction D.

When the light signal is transmitted to the light-incident surface 132B of the optical fiber 130B, a part of the light signal is reflected by the light-incident surface 132B. In order to avoid a situation that the light signal is reflected back to the light-emitting element 120B to cause damage, in the conventional technique, the light-incident surface 132B of the optical fiber 130B is processed into a slope, and a normal vector N1 of the light-incident surface 132B is not parallel to the optical axis 122B. However, it is time-consuming to process the light-incident surface 132B of the optical fiber 130B into the slope, which leads to a poor production efficiency of the conventional optical electrical module 100B.

SUMMARY OF THE INVENTION

The invention is directed to an optical electrical module, which has better reliability.

The invention provides an optical electrical module including a first substrate, a second substrate, a bearing portion and at least one optical electrical element. The second substrate is combined with the first substrate and has a reflective surface facing the first substrate. The bearing portion is disposed between the first substrate and the second substrate to limit at least one light guide element. The optical electrical element is disposed on a surface of the first substrate facing the reflective surface and faces the reflective surface. The optical electrical element is configured for providing or receiving a light signal. The reflective surface and the light guide element are disposed on an optical path of the light signal.

In an embodiment of the invention, the light guide element is an optical fiber or a light guide strip made of polymer or a dielectric material.

In an embodiment of the invention, the light guide element faces the reflective surface, and a space exists between the light guide element and the reflective surface.

In an embodiment of the invention, the light guide element covers the reflective surface.

In an embodiment of the invention, the light guide element has a focusing portion. The focusing portion is located between the optical electrical element and the reflective surface, and positions of the focusing portion, the optical electrical element and the reflective surface are aligned.

In an embodiment of the invention, the bearing portion has at least one groove. The groove is adapted to limit the light guide element.

In an embodiment of the invention, the bearing portion is formed on the second substrate.

In an embodiment of the invention, the second substrate has a cavity, and the reflective surface is a side surface of the cavity. The second substrate has a surface connected to the first substrate. An included angle is formed between the surface of the second substrate and the reflective surface, and the included angle is between 120 degrees and 140 degrees.

In an embodiment of the invention, the first substrate has a cavity, and the optical electrical element is disposed in the cavity, and a bottom surface of the cavity faces the reflective surface of the second substrate.

In an embodiment of the invention, the optical electrical module further includes at least one control unit. The control unit is disposed on the first substrate and is electrically connected to the optical electrical element.

In an embodiment of the invention, one of the first substrate and the second substrate has a containing slot. The containing slot contains the control unit.

In an embodiment of the invention, the first substrate further has at least one through silicon via. One end of the through silicon via is electrically connected to the control unit.

In an embodiment of the invention, the optical electrical module further includes a circuit board. Another end of the through silicon via is electrically connected to the circuit board.

In an embodiment of the invention, the first substrate has at least one first positioning portion, and the second substrate has at least one second positioning portion. The first positioning portion and the second positioning portion are combined to fix the light guide element between the first substrate and the second substrate.

In an embodiment of the invention, the first positioning portion is a groove, and the second positioning portion is a bump. Alternatively, the first positioning portion is the bump, and the second positioning portion is the groove.

In an embodiment of the invention, the groove has a bottom surface and at least one groove side surface. The bump has a top surface and at least one bump side surface. The bottom surface faces the top surface. A vertical plane is substantially perpendicular to the bottom surface and the top surface. An included angle between the groove side surface and the vertical plane is not equal to an included angle between the bump side surface and the vertical plane.

In an embodiment of the invention, the included angle between the groove side surface and the vertical plane is substantially 54.7 degrees or 45 degrees.

In an embodiment of the invention, the included angle between the bump side surface and the vertical plane is substantially 45 degrees or 54.7 degrees.

In an embodiment of the invention, a number of the at least one first positioning portion is four, and a number of the at least one second positioning portion is four.

In an embodiment of the invention, the bearing portion is formed on the second substrate and has at least one groove. The groove is used for containing the light guide element. The first substrate has an inner surface. The inner surface and the groove are used in collaboration to fix the light guide element in the groove.

In an embodiment of the invention, a material of the second substrate is selected from a group consisting of semiconductor, plastic, glass and ceramics.

In an embodiment of the invention, a material of the first substrate is semiconductor.

In an embodiment of the invention, a material of the first substrate and a material of the second substrate are all silicon.

In an embodiment of the invention, the optical electrical element includes a light-receiving element, a light-emitting element or a combination thereof.

In an embodiment of the invention, the light guide element is disposed between the first substrate and the second substrate. The light guide element has a light incident surface and a central axis penetrating through the light incident surface.

The optical electrical element is adapted to provide the light signal to the light guide element. A propagating direction of the light signal before the light signal enters the light guide element is intersected to an extending direction of the central axis.

In an embodiment of the invention, an included angle is formed between the propagating direction of the light signal before the light signal enters the light guide element and the extending direction of the central axis, and the included angle is between 6 degrees and 10 degrees.

In an embodiment of the invention, an included angle is formed between the propagating direction of the light signal before the light signal enters the light guide element and the extending direction of the central axis, and the included angle is 8 degrees.

In an embodiment of the invention, a normal vector of the light incident surface of the light guide element is substantially parallel to the central axis.

In an embodiment of the invention, the optical electrical module further includes an antireflection film disposed on the light incident surface of the light guide element.

In an embodiment of the invention, the optical electrical module further includes a glue material. The light signal is reflected to the light incident surface of the light guide element by the reflective surface of the second substrate, and the glue material covers the light incident surface and the reflective surface of the second substrate.

In an embodiment of the invention, a refractive index of the glue material is between 1.5 and 1.55.

In an embodiment of the invention, the light guide element is an optical fiber or waveguide.

According to the above descriptions, in the optical electrical module of the invention, since the optical electrical element can be fixed to the first substrate through a whole surface, it can be tightly fixed on the first substrate, and does not easily fall off. Therefore, the optical electrical module of the invention has higher reliability.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

First Embodiment

Figure 1:
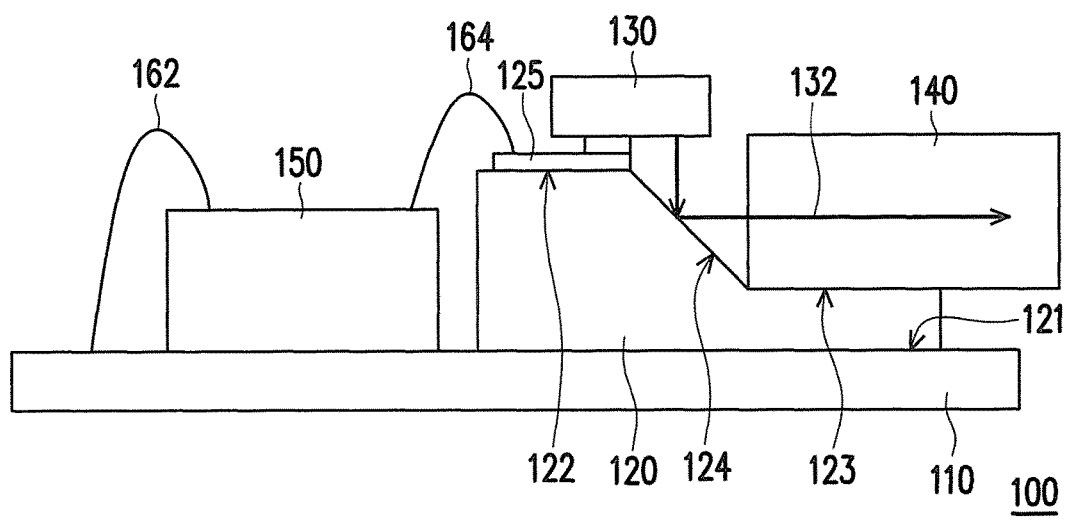
FIG. 1 is a schematic diagram of a conventional optical electrical module.
Figure 2:
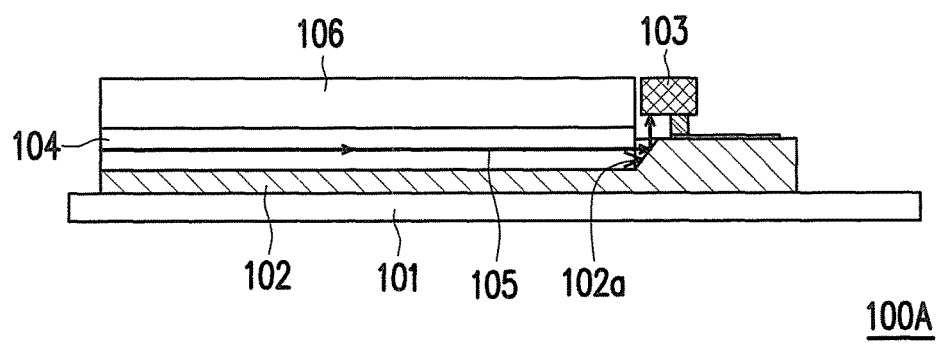
FIG. 2 is a schematic diagram of a package structure of another optical electrical module according to the conventional technique.
Figure 3:
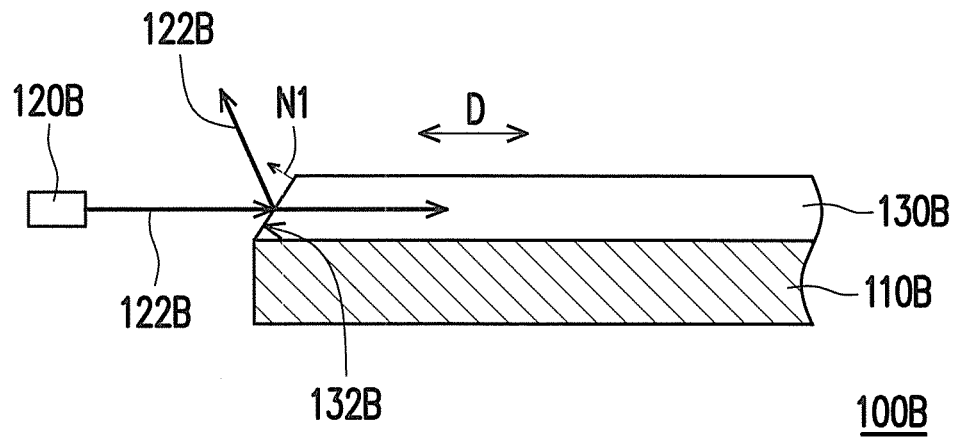
FIG. 3 is a partial cross-sectional view of an optical electrical module of a conventional technique that is used for sending a light signal.
Figure 4:
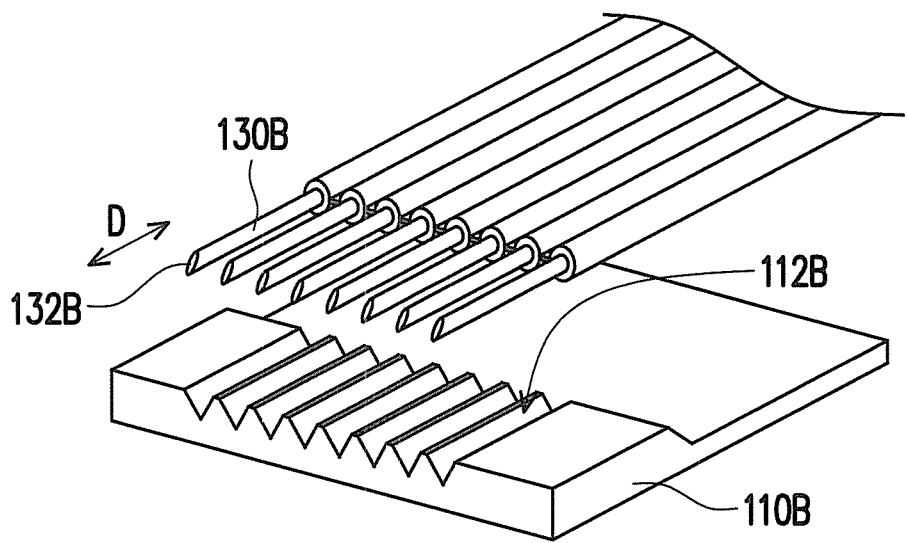
FIG. 4 is a three-dimensional exploded view of a substrate and an optical fiber of FIG. 3.
Figure 5A:
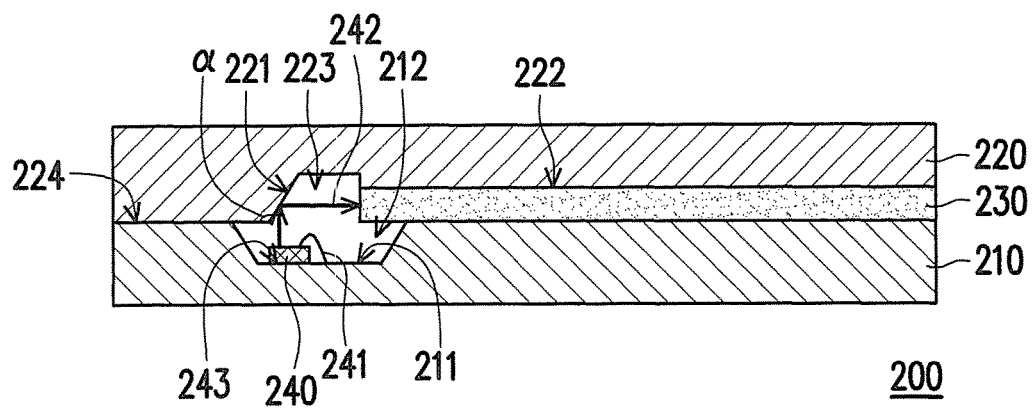
FIG. 5A and FIG. 5B are cross-sectional views of an optical electrical module according to a first embodiment of the invention.
Figure 5B:
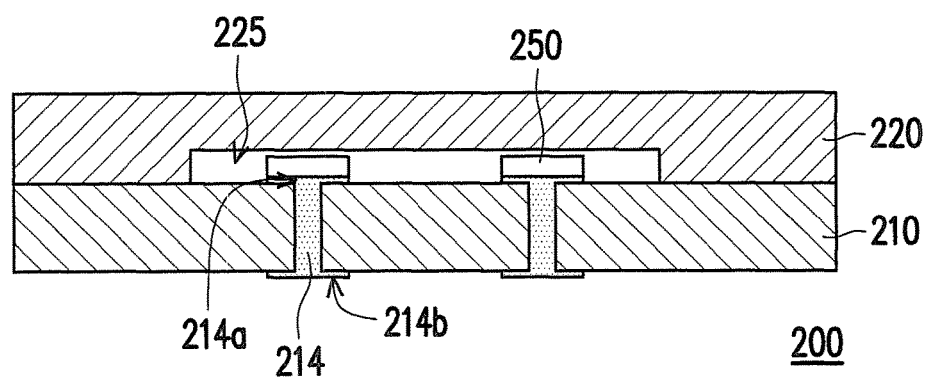
Figure 6:
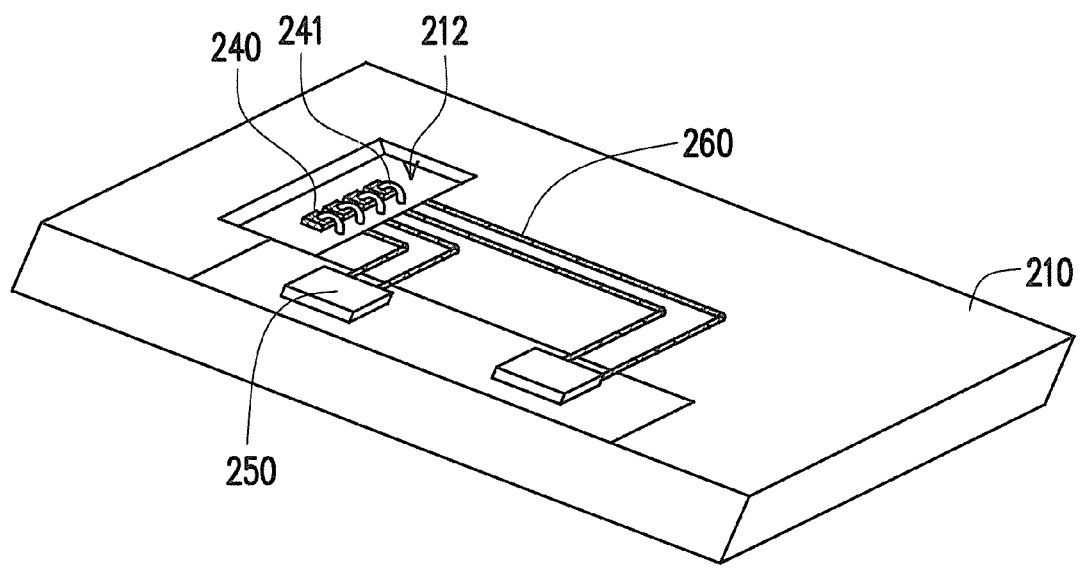
FIG. 6 is a three-dimensional view of a first substrate and elements disposed thereon of FIG. 5A and FIG. 5B.
Figure 7:
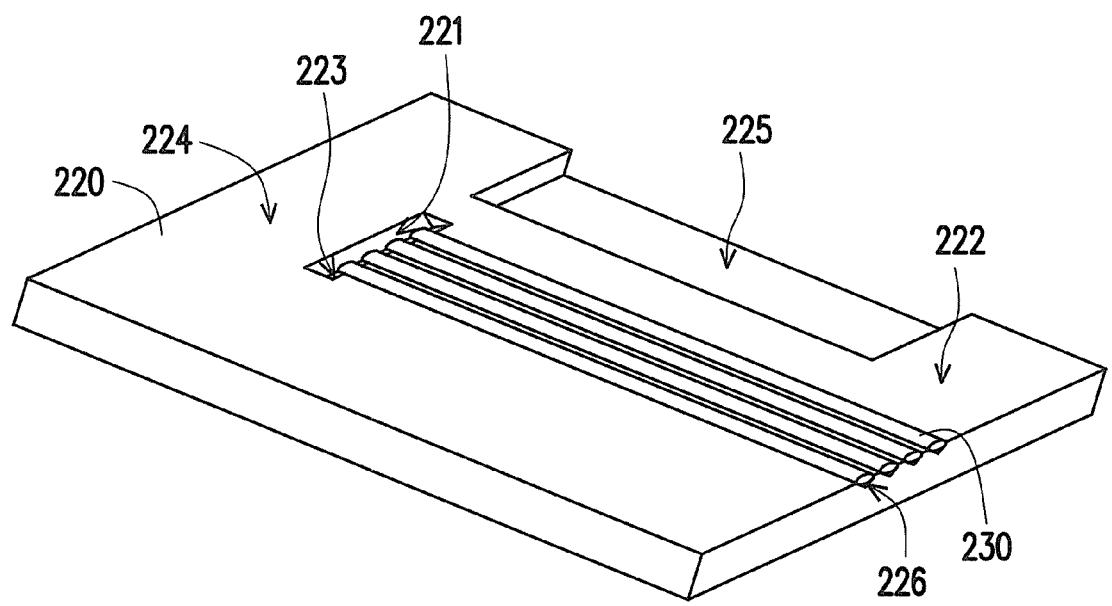
FIG. 7 is a three-dimensional view of a second substrate and elements disposed thereon of FIG. 5A and FIG. 5B.

FIG. 5A and FIG. 5B are cross-sectional views of an optical electrical module according to the first embodiment of the invention. FIG. 6 is a three-dimensional view of a first substrate and elements disposed thereon of FIG. 5A and FIG. 5B. FIG. 7 is a three-dimensional view of a second substrate and elements disposed thereon of FIG. 5A and FIG. 5B. Referring to FIG. 5A, FIG. 6 and FIG. 7, the optical electrical module 200 of the present embodiment is a light signal transmitting module. The optical electrical module 200 includes a first substrate 210, a second substrate 220, a bearing portion 222 and at least one optical electrical element 240. The bearing portion 222 is disposed between the first substrate 210 and the second substrate 220.

In the present embodiment, the bearing portion 222 is, for example, formed on the second substrate 220. In other embodiments, the bearing portion can also be formed on the first substrate. The optical electrical module 200 further includes at least one light guide element 230 or is externally connected to at least one light guide element 230, and the bearing portion 222 is used to limit the light guide element 230. In FIG. 6 and FIG. 7, a plurality of the light guide elements 230 and a plurality of the optical electrical elements 240 are illustrated. However, the numbers of the light guide elements 230 and the optical electrical elements 240 are not limited by the invention. In the present embodiment, the optical electrical element 240 is, for example, a light-emitting element. The first substrate 210 is, for example, a semiconductor substrate, and the second substrate 220 is, for example, a semiconductor substrate or a glass substrate. The semiconductor substrate is, for example, a silicon substrate, though the invention is not limited thereto.

The second substrate 220 is combined with the first substrate 210. The second substrate 220 has a reflective surface 221 facing the first substrate 210. The optical electrical element 240 is disposed on a surface 211 of the first substrate 210 facing the reflective surface 221. The surface 211 is opposite to the reflective surface 221. The optical electrical element 240 is configured for providing a light signal 242 to the reflective surface 221. The reflective surface 221 and the light guide element 230 are disposed on an optical path of the light signal 242. The reflective surface 221 is adapted to reflect the light signal 242 into the light guide element 230, so that the light signal 242 can be transmitted through the light guide element 230.

The first substrate 210 may have a cavity 212, and the optical electrical elements 240 are disposed in the cavity 212. The optical electrical element 240 can be a laser or other suitable light-emitting elements, where the laser can be a vertical cavity surface emitting laser (VCSEL). A size of the cavity 212 is determined according to a size of the optical electrical elements 240 disposed therein. In principle, a minimum size of the cavity 212 is required to accommodate the optical electrical elements 240. In the present embodiment, each of the optical electrical elements 240 is, for example, electrically connected to an internal circuit (not shown) of the first substrate 210 through a bonding wire 241. Moreover, in the present embodiment, the light guide element 230 faces the reflective surface 221, and a space is maintained between the light guide element 230 and the reflective surface 221. The light guide element 230 of the present embodiment is, for example, an optical fiber or a light guide strip made of polymer or a dielectric material.

The second substrate 220 may have a cavity 223, and the reflective surface 221 is a surface of the cavity 223. The reflective surface 221 can be selectively coated with a reflection material to improve reflectivity thereof. As shown in FIG. 7, the bearing portion 222 is configured with at least one positioning structure 226 for fixing the light guide element 230. The number of the positioning structures 226 can correspond to the number of the light guide elements 230, so that each of the light guide elements 230 can be fixed in a corresponding positioning structure 226. Each of the positioning structures 226 of the present embodiment is, for example, a groove; though the invention is not limited thereto, and in other embodiments, the positioning structures 226 can be protruded positioning structures. Moreover, it should be noticed that in FIG. 5A, an included angle α between the reflective surface 221 and a surface 224 of the second substrate 220 connected to the first substrate 210 can be designed according to a position of the optical electrical elements 240 and a position of the positioning structures 226 of the bearing portion 222. When the included angle α is between 120 degrees and 140 degrees, the optical electrical module 200 may have a good effect of transmitting the light signal 242. Further, when the included angle α is 135 degrees or 125 degrees, the reflective surface 221 is easily fabricated.

Referring to FIG. 5B, FIG. 6 and FIG. 7, the optical electrical module 200 of the present embodiment may further include at least one control unit 250. The control unit 250 is, for example, disposed on the first substrate 210, and is electrically connected to the optical electrical element 240. In detail, the control unit 250 is, for example, a control chip. As shown in FIG. 6, the control unit 250 can be electrically connected to the corresponding optical electrical elements 240 through wires 260 disposed on the first substrate 210 and an internal circuit (not shown) of the first substrate 210. The control unit 250 can be used to control one or a plurality of the optical electrical elements 240, which is not limited by the invention. The control unit 250 controls the optical electrical element 240 to send the corresponding light signal 242 according to information to be transmitted. In the present embodiment, as shown in FIG. 5B and FIG. 7, the second substrate 220 may have a containing slot 225 for containing the control unit 250, though the invention is not limited thereto, and in other embodiments, the containing slot 225 used for containing the control unit 250 can also be disposed on the first substrate 210.

Figure 8:
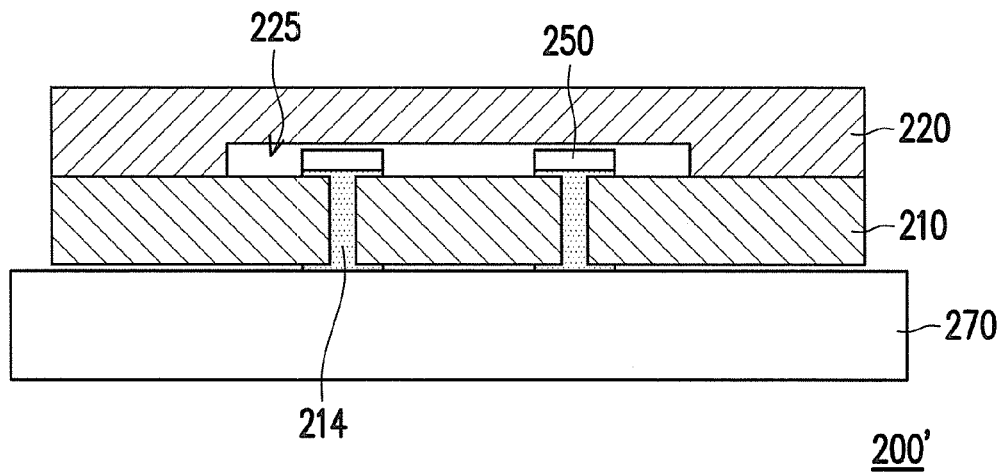
FIG. 8 is a cross-sectional view of an optical electrical module according to another embodiment of the invention.

Moreover, as shown in FIG. 5B, the first substrate 210 of the present embodiment can be configured with at least one through silicon via 214. One end 214a of each of the through silicon vias 214 is electrically connected to the corresponding control unit 250. In this way, each of the control units 250 can be electrically connected to other elements through another end 214b of the through silicon via 214. For example, FIG. 8 is a cross-sectional view of an optical electrical module according to another embodiment of the invention. Referring to FIG. 8, in the present embodiment, compared to the optical electrical module 200, the optical electrical module 200' further includes a circuit board 270. The first substrate 210 is disposed on the circuit board 270. The control units 250 can be electrically connected to the circuit board 270 through the through silicon vias 214.

Referring to FIG. 5A, in the optical electrical module 200 of the present embodiment, the optical electrical element 240 is on the first substrate 210, and the light guide element 230 is disposed on the second substrate 220. Therefore, a bottom surface 243 of the optical electrical element 240 can be fully fixed on the surface 211 of the cavity 212 of the first substrate 220, where the surface 211 faces the reflective surface 221. Compared to the conventional technique that the light-emitting element and the pad has a small contact area, a contact area between the optical electrical element 240 of the optical electrical module 200 and the surface 211 of the present embodiment is relatively large, so that the optical electrical element 240 can be tightly fixed on the first substrate 210 to improve reliability of the optical electrical module 200. Moreover, in the present embodiment, a semiconductor substrate can be used as the first substrate 210. Since a fabrication technique of the semiconductor substrate is mature, a thickness of the first substrate 210 can be effectively reduced. Moreover, in the present embodiment, a semiconductor substrate or a glass substrate can be used as the second substrate 220, and since the fabrication technique of the semiconductor substrate and a grinding technique of the glass substrate are mature, the thickness of the second substrate 220 can also be effectively reduced. Therefore, the optical electrical module 200 of the present embodiment has an advantage of thinness.

Figure 9:
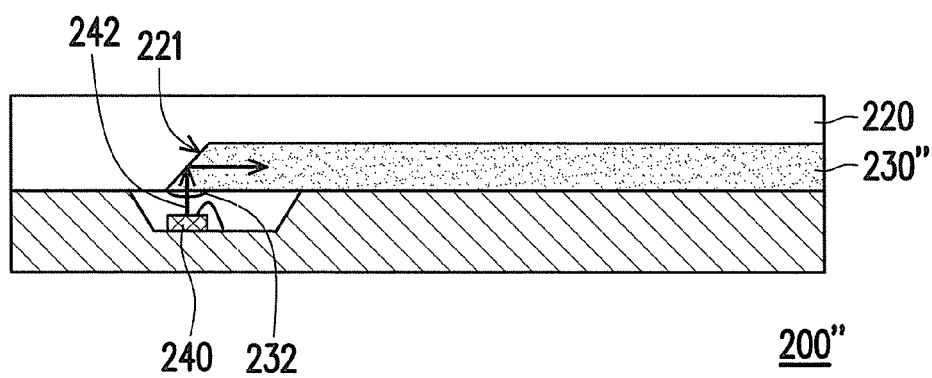
FIG. 9 is a cross-sectional view of an optical electrical module according to still another embodiment of the invention.

FIG. 9 is a cross-sectional view of an optical electrical module according to still another embodiment of the invention. Referring to FIG. 9, the optical electrical module 200" of the present embodiment is similar to the optical electrical module 200 of the first embodiment, and a difference there between is that in the optical electrical module 200", a light guide element 230" can cover the reflective surface 221 of the second substrate 220. Namely, the light guide element 230" can contact the reflective surface 221. There is no space between the light guide element 230" and the reflective surface 221. A material of the light guide element 230" can be polymer or a dielectric material. Moreover, it should be noticed that the light guide element 230" may have a focusing portion 232. The focusing portion 232 is located between the optical electrical element 240 and the reflective surface 221, and a position of the focusing portion 232 corresponds to positions of the optical electrical element 240 and the reflective surface 221, so as, to converge the light signal 242 provided by the optical electrical element 240. Use of the focusing portion 232 can further improve a light coupling efficiency of the optical electrical module 200".

Figure 10:
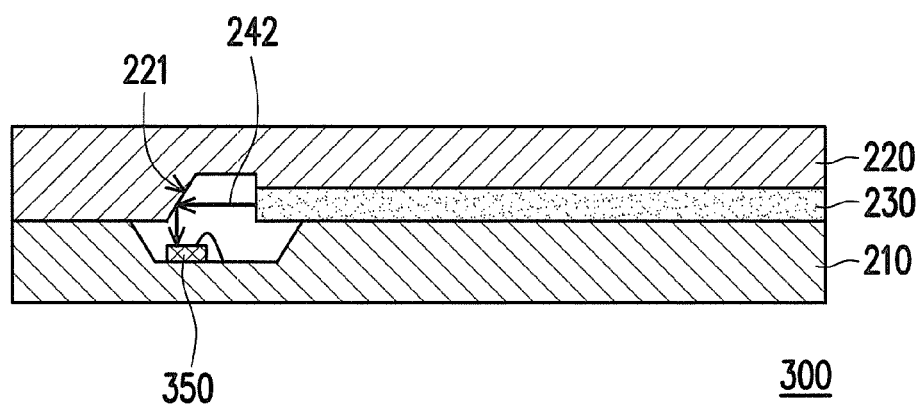
FIG. 10 is a cross-sectional view of an optical electrical module according to yet another embodiment of the invention.

FIG. 10 is a cross-sectional view of an optical electrical module according to yet another embodiment of the invention. Referring to FIG. 10, the optical electrical module 300 of the present embodiment is similar to the optical electrical module 200 of the first embodiment, and a difference there between is that the optical electrical module 300 is a light signal receiving module. In detail, a structure of the optical electrical module 300 is similar to that of the optical electrical module 200, and a difference there between is that in the optical electrical module 300, an optical electrical element 350 is used to replace the optical electrical element 240 of the optical electrical module 200, and the optical electrical element 350 is a light receiving element. The optical electrical element 350 is, for example, a photo diode or other suitable photo sensors. In the optical electrical module 300, the light guide element 230 is adapted to transmit the light signal 242 to the reflective surface 221 of the second substrate 220, and the reflective surface 221 is adapted to reflect the light signal 242 to the optical electrical element 350 for reception. Moreover, a control unit (not shown) of the optical electrical module 300 can convert the light signal 242 received by the optical electrical element 350 into an electric signal. The optical electrical module 300 of the present embodiment has the same advantage with that of the optical electrical module 200 of the first embodiment, which is not repeated therein.

Second Embodiment

Figure 11A:
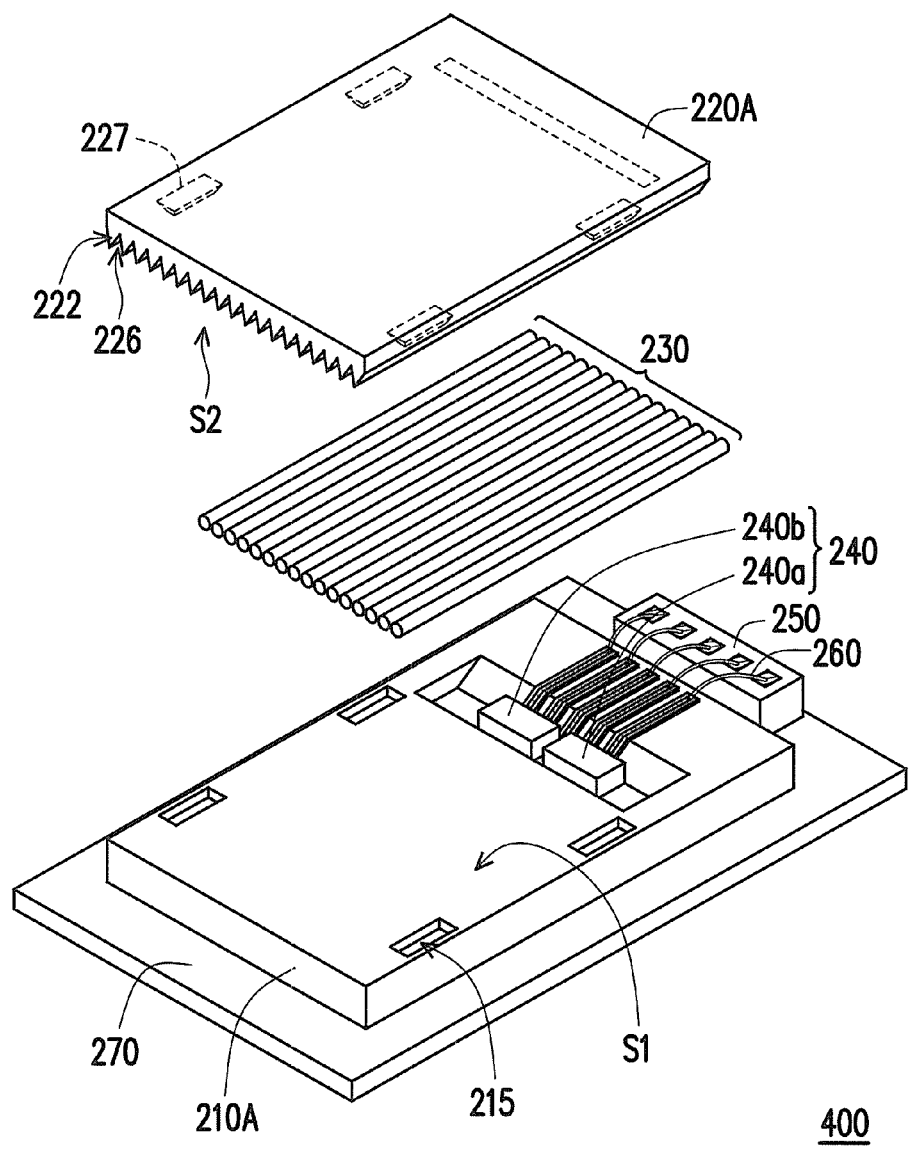
FIG. 11A is a three-dimensional exploded view of an optical electrical module according to a second embodiment of the invention.
Figure 11B:
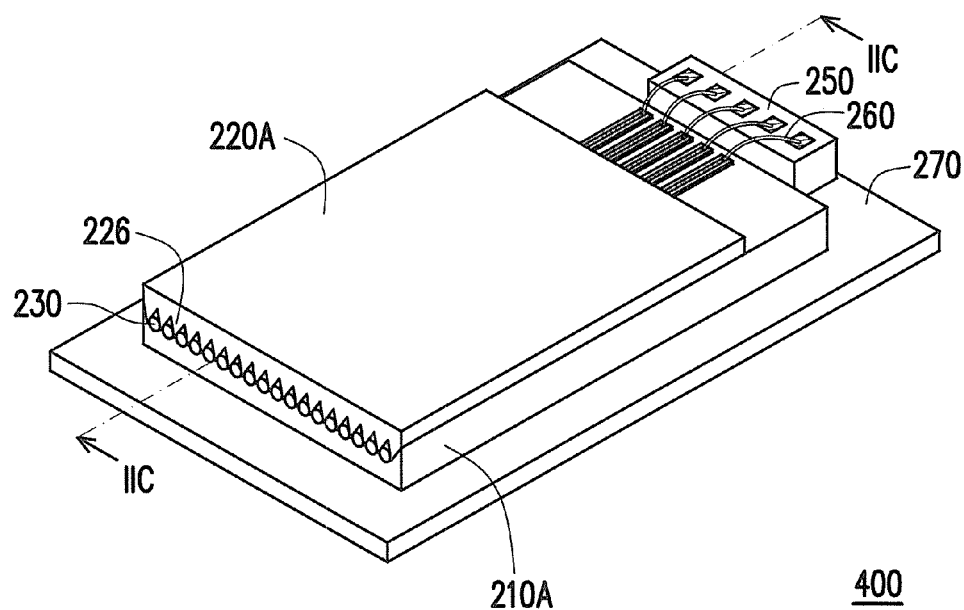
FIG. 11B is a three-dimensional combination view of the optical electrical module of FIG. 11A.
Figure 11C:
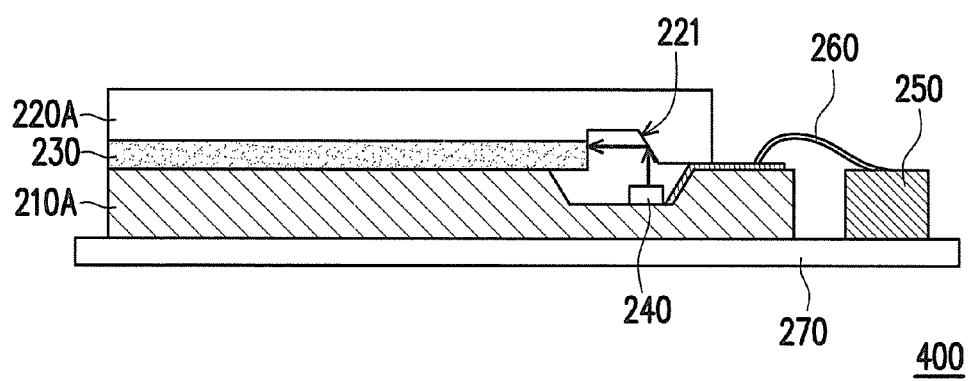
FIG. 11C is a cross-sectional view of the optical electrical module of FIG. 11B along a section line 11C.

FIG. 11A is a three-dimensional exploded view of an optical electrical module according to a second embodiment of the invention. FIG. 11B is a three-dimensional combination view of the optical electrical module of FIG. 11A. FIG. 11C is a cross-sectional view of the optical electrical module of FIG. 11B along a section line IIC. Referring to FIG. 11A to FIG. 11C, the optical electrical module 400 of the present embodiment is similar to the optical electrical module 200 of the first embodiment, and the same elements are denoted by the same referential number, and a main difference there between is that in the optical electrical module 400 of the present embodiment, the first substrate 210A has at least one first positioning portion 215. The second substrate 220A has at least one second positioning portion 227. The first positioning portion 215 and the second positioning portion 227 are combined to fix the light guide elements 230 between the first substrate 210A and the second substrate 220A. Based on a design of the first positioning portion 215 and the second positioning portion 227, the first substrate 210A can be easily aligned to the second substrate 220A, and process robustness of the optical electrical module 400 can be improved and the fabrication cost thereof can be reduced. The differences of the optical electrical modules 400 and 200 are described in detail below, and the same parts are not repeated.

Referring to FIG. 11A to FIG. 11C, the optical electrical module 400 of the present embodiment further has an effect of fixing the light guide elements 230. In the present embodiment, the light guide element 230 can be an optical fiber or waveguide. To facilitate descriptions, in the present embodiment, a plurality of optical fibers is used to represent the light guide elements 230. The optical electrical module 400 includes the first substrate 210A and the second substrate 220A. The optical electrical module 400 can be disposed on a substrate, where the substrate is, for example, a circuit board 270. In the present embodiment, the first substrate 210A is used to carry the optical electrical element 240, and the second substrate 220A can be a cover used to fix the light guide elements 230. In the present embodiment, the optical electrical element 240 includes a light receiving element 240a and a light-emitting element 240b.

The first substrate 210A of the present embodiment has a carrying surface S1 and the first positioning portions 215 disposed on the carrying surface S1. The second substrate 220A has an inner surface S2 and the second positioning portions 227 disposed on the inner surface S2. The second substrate 220A further has positioning structures 226 used for accommodating the light guide elements 230 and the reflective surface 221 (shown in FIG. 11C). The reflective surface 221 of the present embodiment may have a diffractive optical element (DOE) or can be a planar reflective surface. The first positioning portion 215 is used to combine with the second positioning portion 227, so that the first substrate 210A and the second substrate 220A are precisely combined, and the carrying surface S1 of the first substrate 220A fixes the light guide elements 230 in the positioning structures 226 of the second substrate 220A.

In the present embodiment, the first positioning portion 215 can be a bump, and the second positioning portion can be a groove, though the invention is not limited thereto. Moreover, it should be noticed that four first positioning portions 215 and four second positioning portions 227 of FIG. 11A are taken as an example for descriptions. However, the numbers of the first positioning portion 215 and the second positioning portion 227 are not limited by the invention, which can be suitably adjusted according to an actual design requirement. A diameter of the light guide element 230 is, for example, 125 μm, and a depth of the positioning structure 226 is between 50 μm and 200 μm. The carrying surface S1 of the first substrate 210A can be a plane or a concave and convex surface designed in collaboration with the positioning structures 226 of the second substrate 220A. The carrying surface S1can fix the light guide elements 230 in the positioning structures 226 of the second substrate 220A through a pressing manner. For example, if the light guide element 230 protrudes out from the positioning structure 226, the inner surface S2 can be a concave and convex surface, and positions of the positioning structures 226 on the inner surface S2 correspond to positions of the light guide elements 230. The carrying surface S1and the positioning structures 226 work together to fix the light guide elements 230 in the optical electrical module 400.

In the present embodiment, a material of the first substrate 210A can be a semiconductor. Further, the material of the first substrate 210A is, for example, silicon. A material of the second substrate 220A can be a semiconductor, plastic, glass and ceramics or a group formed by at least two of the above materials. If the material of the second substrate 220A is plastic, the second positioning portions 227 can be formed through injection molding. In another embodiment of the invention, the first substrate 210A and the second substrate 220A can be formed by polysilicon, where the first positioning portions 215 of the first substrate 210A, the second positioning portions 227 of the second substrate 220A and the reflective surface 221 can all be formed through an etching process (for example, wet etching).

Figure 11D:
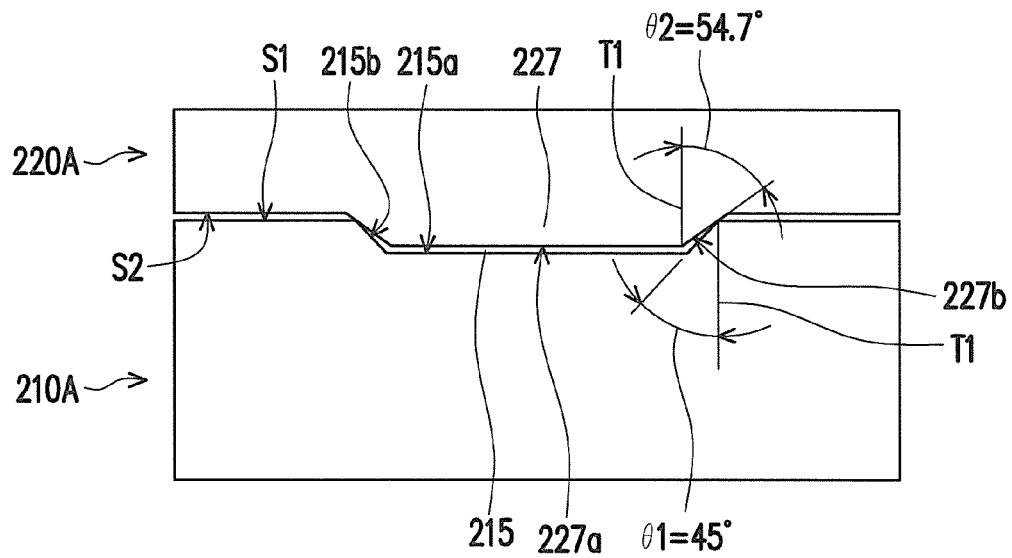
FIG. 11D is an enlarged cross-sectional view of a first positioning portion and a second positioning portion of FIG. 11B.

FIG. 11D is an enlarged cross-sectional view of the first positioning portion and the second positioning portion of FIG. 11B. Referring to FIG. 11D, the first positioning portion 215 has a bottom surface 215a and at least one groove side surface 215b. The second positioning portion 227 has a top surface 227a and at least one bump side surface 227b. The bottom surface 215a faces the top surface 227a. An included angle θ1 between the groove side surface 215b and a vertical plane T1 is not equal to an included angle θ2 between the bump side surface 227b and the vertical plane T1. The vertical plane T1 is substantially perpendicular to the bottom surface 215a and the top surface 227a. In detail, the included angle θ2 is substantially greater than or smaller than the included angle θ1, so that the second positioning portion 227 is tightly engaged to the first positioning portion 215. In the present embodiment, the included angle θ1 is, for example, 45 degrees, and the included angle θ2 is, for example, 54.7 degrees.

When the first substrate 210A and the second substrate 220A of the present embodiment are all formed by a polysilicon material, since the polysilicon has a face-centered cubic (FCC) lattice structure, the second positioning portion 227 fabricated through the etching process can be formed by intersecting a <111> lattice plane and a <100> lattice plane. Substantially, the included angle θ2 between the <111> lattice plane and the <100> lattice plane is substantially 54.7 degrees. The first positioning portion 215 fabricated through the etching process can be formed by intersecting a <110> lattice plane and the <100> lattice plane. Substantially, the included angle θ1 between the <110> lattice plane and the <100> lattice plane is substantially 45 degrees.

Figure 12:
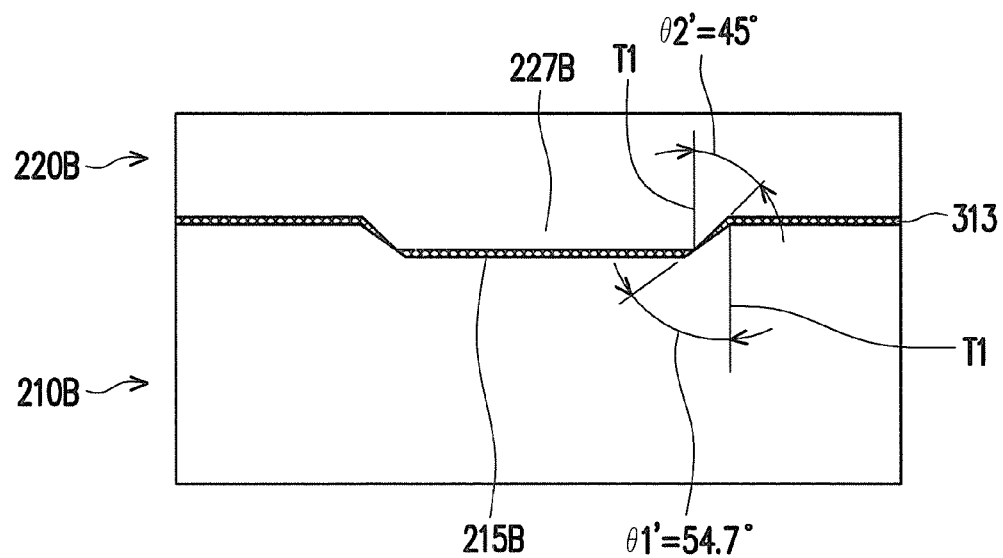
FIG. 12 is an enlarged cross-sectional view of a first positioning portion and a second positioning portion of an optical electrical module according to another embodiment of the invention.

FIG. 12 is an enlarged cross-sectional view of the first positioning portion and the second positioning portion of the optical electrical module according to another embodiment of the invention. Referring to FIG. 12, in another embodiment of the invention, an included angle θ2' is substantially smaller than an included angle θ1'. A second positioning portion 227B of a second substrate 220B can be formed by intersecting the <110> lattice plane and the <100> lattice plane. The included angle θ2' between the <110> lattice plane and the <100> lattice plane is substantially 45 degrees. A first positioning portion 215B of a first substrate 210B can be formed by intersecting a <111> lattice plane and the <100> lattice plane. The included angle θ1' between the <111> lattice plane and the <100> lattice plane is substantially 54.7 degrees. Particularly, in order to closely combine the first substrate 210B and the second substrate 220B, a glue material 313 can be filled between the first substrate 210B and the second substrate 220B. The glue material 313 is, for example, a silicon based glue, an UV glue, an epoxy resin glue or other suitable materials.

Figure 13:
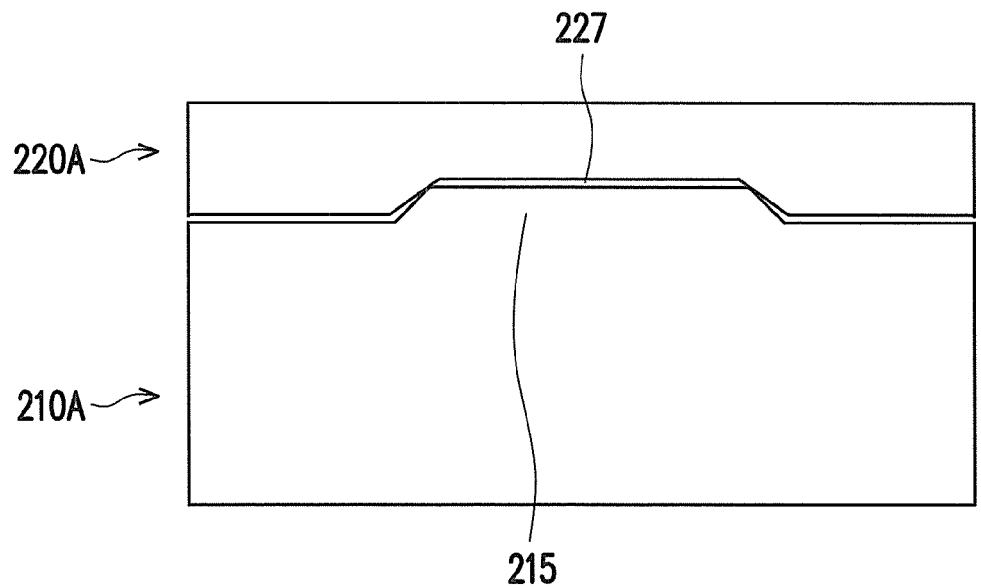
FIG. 13 is an enlarged cross-sectional view of a first positioning portion and a second positioning portion of an optical electrical module according to still another embodiment of the invention.

FIG. 13 is an enlarged cross-sectional view of the first positioning portion and the second positioning portion of an optical electrical module according to still another embodiment of the invention. In FIG. 11A to FIG. 11D, the first positioning portion 215 is a groove, and the second positioning portion 227 is a bump. However, the invention is not limited thereto. In the embodiment of FIG. 13, the first positioning portion 215 is a bump and the second positioning portion 227 is a groove.

Third Embodiment

Figure 14:
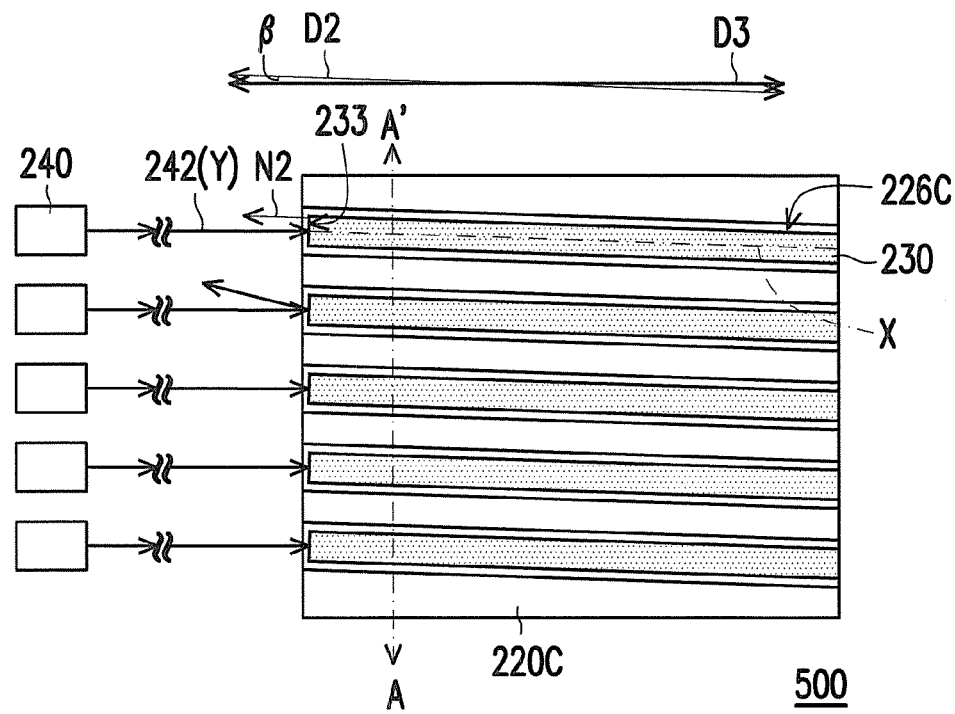
FIG. 14 is a top view of an optical electrical module according to a third embodiment of the invention.
Figure 15:
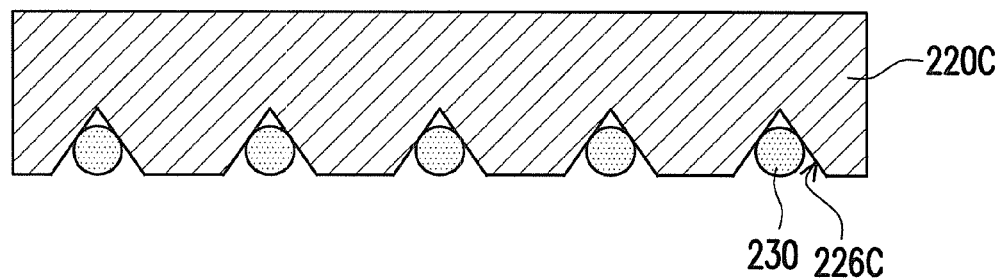
FIG. 15 is a cross-sectional view of the optical electrical module of FIG. 14 along a section line A-A'.

FIG. 14 is a top view of an optical electrical module according to a third embodiment of the invention. For clarity's sake, the first substrate is omitted in FIG. 14. FIG. 15 is a cross-sectional view of the optical electrical module of FIG. 14 along a section line A-A'. Referring to FIG. 14 and FIG. 15, the optical electrical module 500 of the present embodiment is similar to the optical electrical module 200 of the first embodiment, and the same elements are denoted by the same referential numbers. A main difference of the optical electrical modules 500 and 200 is that in the optical electrical module 500 of the present embodiment, a propagating direction of the light signal 242 before the light signal 242 enters the light guide element 230 is intersected to an extending direction of a central axis X of the light guide element 230. The differences of the optical electrical modules 500 and 200 are described in detail below, and the same parts are not repeated.

The optical electrical module 500 of the present embodiment can be applied to an optical communication device that requires parallel light coupling such as a planar lightwave circuit splitter (PLC splitter), an array waveguide grating (AWG), or a quad small-form factor pluggable transceiver (QSFP transceiver), etc.

It should be noticed that the center axis X of the light guide element 230 of the present embodiment is parallel to a straight-line direction D2. The propagating direction of the light signal 242 before the light signal 242 enters a light incident surface 233 of the light guide element 230 is parallel to a straight-line direction D3. An included angle β is formed between the straight-line direction D3 and the straight-line direction D2, and the included angle β is not 0 degree or 180 degrees. In other words, the extending direction of the central axis X of the light guide element 230 is intersected to the propagating direction of the light signal 242 before the light signal 242 enters the light incident surface 233. In detail, since a normal vector N2 of the light incident surface 233 is parallel to the straight-line direction D2, i.e. parallel to the center axis X, the normal vector N2 of the light incident surface 233 can be not parallel to an optical axis Y of the light signal 242 without processing the light incident surface 233 into a slope oblique to the optical axis Y of the light signal 242. Since the normal vector N2 of the light incident surface 233 is not parallel to the optical axis Y of the light signal 242, even if a part of the light signal 242 is reflected by the light incident surface 233, the light signal 242 reflected by the light incident surface 233 still cannot be transmitted back to the optical electrical element 240, which avoids damaging the optical electrical element 240. In the optical electrical module 500 of the present embodiment, since the light signal 242 can be prevented from being reflected back to the optical electrical element 240 by the light incident surface 233 without processing the light incident surface 233, a processing step of the light incident surface 233 is omitted, and production efficiency of the optical electrical module 500 is improved.

It should be noticed that optical elements (not shown) such as a reflection element and a light convergent element, etc. can be disposed on the optical path between the optical electrical element 240 and the light incident surface 233 of the light guide element 230 for guiding the light signal 242 to the light incident surface 233 of the light guide element 230 and enter the light guide element 230 through the light incident surface 233. Moreover, the included angle β is, for example, between 6 degrees and 10 degrees, which is preferably 8 degrees, though the invention is not limited thereto.

Figure 16:
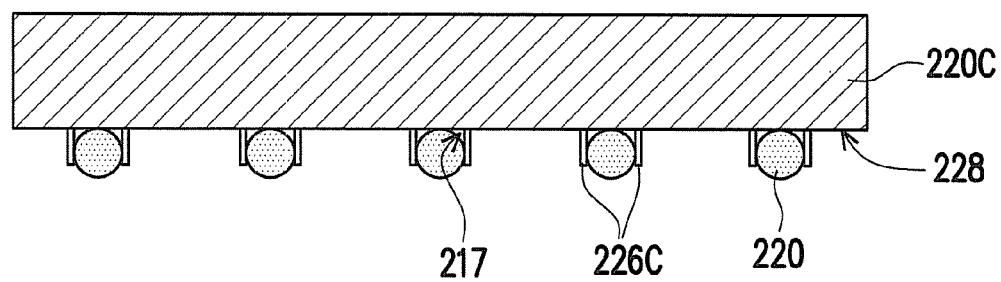
FIG. 16 is a cross-sectional view of an optical electrical module according to another embodiment of the invention.

As shown in FIG. 15, in the present embodiment, positioning structures 226C of the second substrate 220C are for example, grooves, though the invention is not limited to a specific shape of the positioning structure 226C, and the positioning structures 226C are only required to have an effect of limiting the light guide elements 230. For example, FIG. 16 is a cross-sectional view of an optical electrical module according to another embodiment of the invention. Referring to FIG. 16, in the present embodiment, the positioning structures 226C can be a plurality of alignment pillars protruded out from a surface 228 of the second substrate 220C. A groove 217 is formed between two adjacent alignment pillars and the carrying portion 228, and the light guide element 230 is disposed in the groove 217. In other embodiments, the positioning structures 226C disposed on the substrate can be omitted, and other methods can be used to extend the light guide elements along the straight-line direction D2.

Figure 17:
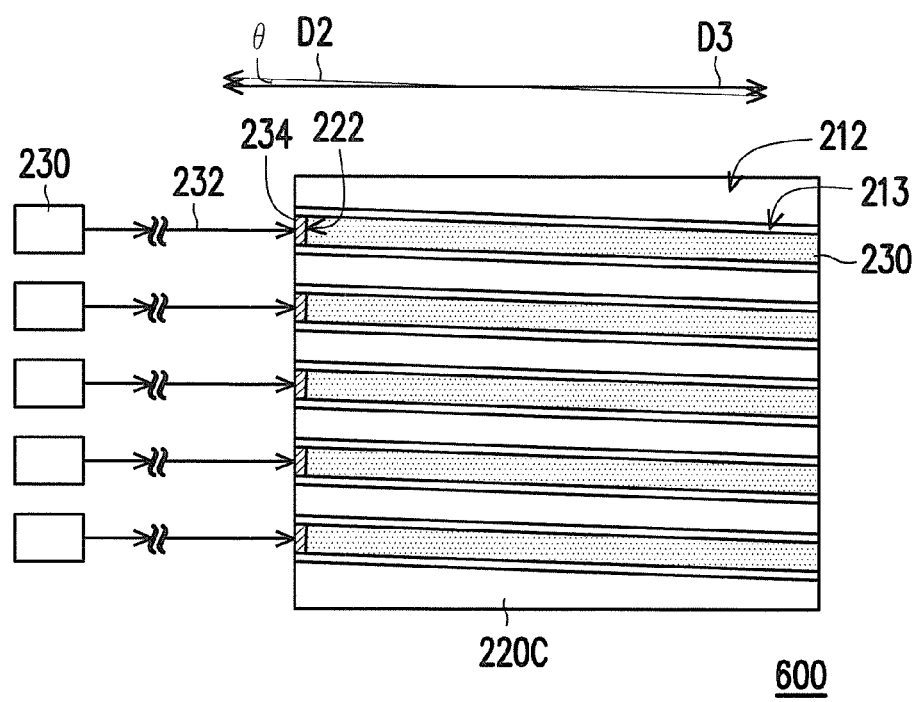
FIG. 17 is a top view of an optical electrical element according to still another embodiment of the invention.

FIG. 17 is a top view of an optical electrical element according to still another embodiment of the invention. For clarity's sake, the first substrate is omitted in FIG. 17. Referring to FIG. 17, the optical electrical module 600 of the present embodiment has advantages and a structure similar to that of the optical electrical module 500 of FIG. 14, and a difference there between is that the optical electrical element 600 further includes an antireflection layer 234. The antireflection layer 234 is disposed on the light incident surface 233 of the light guide element 230 to reduce a chance that the light incident surface 233 reflects the light signal 242, so as to reduce loss of the light signal 242.

Figure 18:
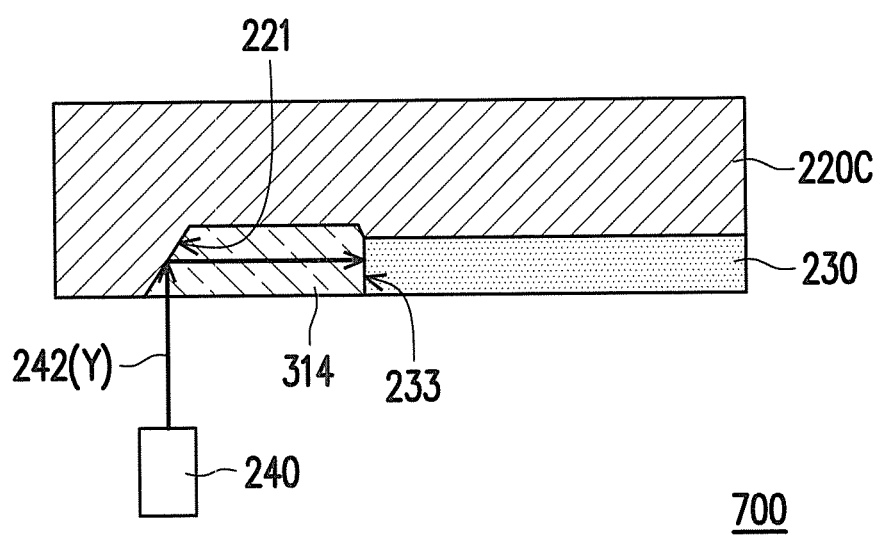
FIG. 18 is a cross-sectional view of an optical electrical element according to an embodiment of the invention.

FIG. 18 is a cross-sectional view of an optical electrical element according to an embodiment of the invention. Referring to FIG. 18, the optical electrical module 700 of the present embodiment has advantages and a structure similar to that of the optical electrical module 500. The second substrate 220 of the optical electrical element 700 also has the reflective surface 221. The reflective surface 221 is located on the optical axis Y of the light signal 242 provided by the optical electrical element 240. The light signal 242 provided by the optical electrical element 240 can be reflected by the reflective surface 221 to reach the light incident surface 233 of the light guide element 230. A difference between the optical electrical module 700 and the optical electrical module 500 is that the optical electrical element 700 further includes a glue material. The glue material 314 is disposed between the reflective surface 221 and the light guide element 230, and covers the light incident surface 233 of the light guide element 230 and the reflective surface 221. A refractive index of the glue material 314 is between a refractive index of the light guide element 220 and a refractive index of air, such that light incident efficiency of the light guide element 230 is improved, and light loss is reduced. In case that the light guide element 230 is the optical fiber, the refractive index of the glue material 314 is, for example, between 1.5 and 1.55. The glue material 314 can be silicone or other suitable materials.

Figure 19A:
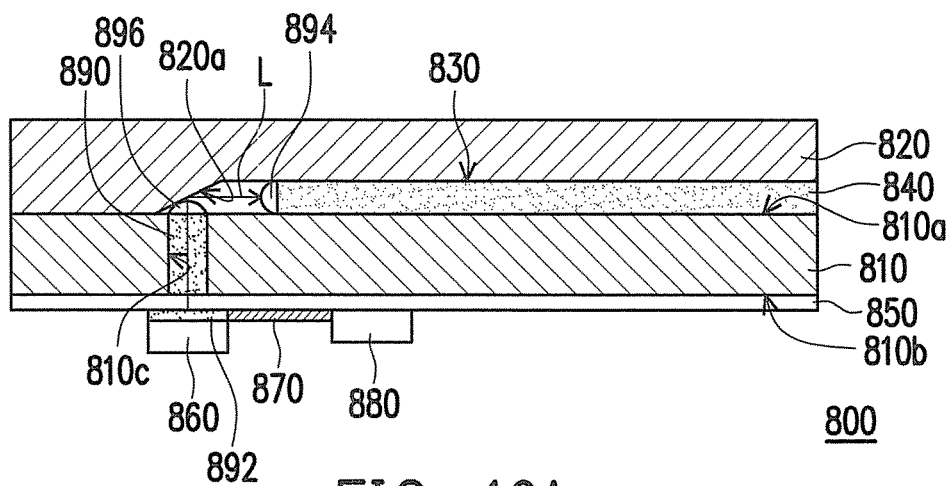
FIG. 19A is a cross-sectional view of an optical electrical element according to an embodiment of the invention.

FIG. 19A is a cross-sectional view of an optical electrical element according to an embodiment of the invention. Referring to FIG. 19A, an optical electrical module 800 includes a first substrate 810, a second substrate 820, a bearing portion 830, at least one light guide element 840, an insulation layer 850, at least one optical electrical element 860, at least one conductive trace 870 and a driver 880. The second substrate 820 is combined with the first substrate 810. In detail, the first substrate 810 and the second substrate 820 are combined by the first positioning portion and the second positioning portion as shown in FIG. 11A, FIG. 11D, FIG. 12 or FIG. 13. The first substrate 810 has a first surface 810a facing the second substrate 820, a second surface 810b facing away from the second substrate 820 and a through hole 810c passing through the first surface 810a and the second surface 810b. The second substrate 820 has a reflective surface 820a facing the first substrate 810 and disposed in an optical path of the light signal L. In the embodiment of FIG. 19A, a material of the first substrate 810 and a material of the second substrate 820 may be the same. For example, the material of the first substrate 810 and the material of the second substrate 820 may be silicon, but the invention is not limited thereto. In other embodiments, a material of the first substrate 810 and a material of the second substrate 820 may be different.

A bearing portion 830 is disposed between the first substrate 810 and the second substrate 820 to limit at least one light guide element 840. The practicable structure of the bearing portion 830 and the practicable structure of light guide element 840 are respectively the same with the bearing portion 222 and the light guide element 230 in FIG. 5A. An insulation layer 850 is disposed on the second surface 810b of the first substrate 810. The insulation layer 850 is located between the first substrate 810 and the driver 880. The insulation layer 850 covers the through hole 810c. A material of the insulation layer 850 may be SiOx, SiNx or other suitable materials.

At least one optical electrical element 860 is disposed on the insulation layer 850. Optical electrical element 860 covers at least a portion of the area on the second surface 810b of through hole 810c, in another embodiment of the invention, optical electrical element 860 may fully cover the area of through hole 810c. The optical electrical element 860 is configured for providing or receiving a light signal L passing through the light guide element 840, the through hole 810c and the insulation layer 850. The optical electrical element 860 is a light-emitting element or a light-receiving element.

At least one conductive trace 870 is disposed on the insulation layer 850, and the term of "on the insulation layer" means on the surface of the insulation layer or on a recess of the insulation layer (not showing in the figures). The optical electrical element 860 is bonding to the conductive trace 870 so as to be electrically connected to the conductive trace 870. In the embodiment of FIG. 19A, a material of the conductive trace 870 is but not limited to metal, polysilicon, or silicon metal. A driver 880 is disposed on the insulation layer 850 and is used for driving the optical electrical element 860. A driver 880 is bonding to the conductive trace 870 so as to be electrically connected to the conductive trace 870. In other word, the optical electrical element 860 and the driver 880 are electrically connected to each other by the conductive trace 870. The driver 880 may be a driving IC, a transimpedance amplifier (TIA) or a driving circuit.

The optical electrical module 800 may further includes a filler 890 filled in the through hole 810c of the first substrate 810. The light signal L further passes through the through hole 810c. An underfill 892 is formed between the optical electrical element 860 and the insulation layer 810. The underfill 892 can fix the optical electrical element 860 to the first substrate 810 tightly so that the optical electrical element 860 is not be easily separated from the first substrate 810. In other word, the reliability of the optical electrical module 800 can be increased by the underfill 892.

The optical electrical module 800 further includes a first lens 894 disposed between the reflective surface 820a and the light guide element 840 and protruding toward the reflective surface 820a. The optical electrical module 800 further includes a second lens 896 disposed on the first surface 810a of the first substrate 810. The second lens 896 is located between the reflective surface 820a and the filler 890. The second lens 896 covers the through hole 810c of the first substrate 810 and protrudes toward the second substrate 820. The filler 890, the underfill 892, the first lens 894, and the second lens 896 are optional.

Figure 19B:
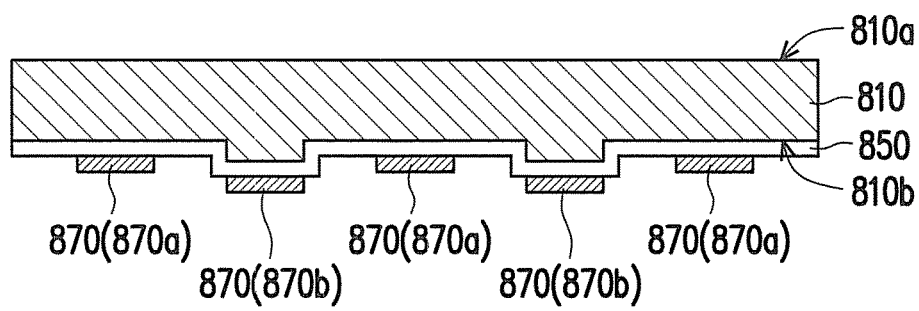
FIG. 19B is another embodiment of the invention showing the adjacent two conductive traces are arranged in the different plane.
Figure 19C:
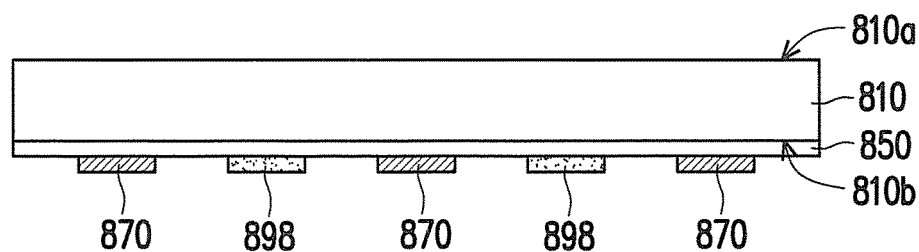
FIG. 19C is another embodiment of the invention showing the adjacent two conductive traces are separated by a shielding structure.

Specially, the conductive trace 870 is formed by the semiconductor process including the exposing step, the developing step and the etching step so that a profile of the conductive trace 870 can be controlled precisely. That is benefit to the reduction of cross talk. FIG. 19B is another embodiment of the invention showing the adjacent two conductive traces 870a and 870b are arranged in the different plane, and such arrangement can further improve the effect preventing the adjacent two conductive traces from cross talk. In one embodiment of the invention, as showing in the FIG. 19B, the adjacent two conductive traces 870a and 870b are respectively disposed on a recess portion and a protrusion portion of the second surface 810b of the first substrate 810 covered by the insulation layer 850. In another embodiment of the invention, the second surface 810b is substantially flat, and conductive traces 870a are formed in the insulation layer 850 or at least a portion thereof formed in the insulation layer 850 and the adjacent conductive traces 870b are formed on the insulation layer 850 FIG. 19C is another embodiment of the invention showing the adjacent two conductive traces are separated by a shielding structure 898, which can provide positive effect to reduce cross talk between the two conductive trace. A material of the shielding trace 898 is but not limited to metal, polysilicon, or silicon metal.

Figure 20A:
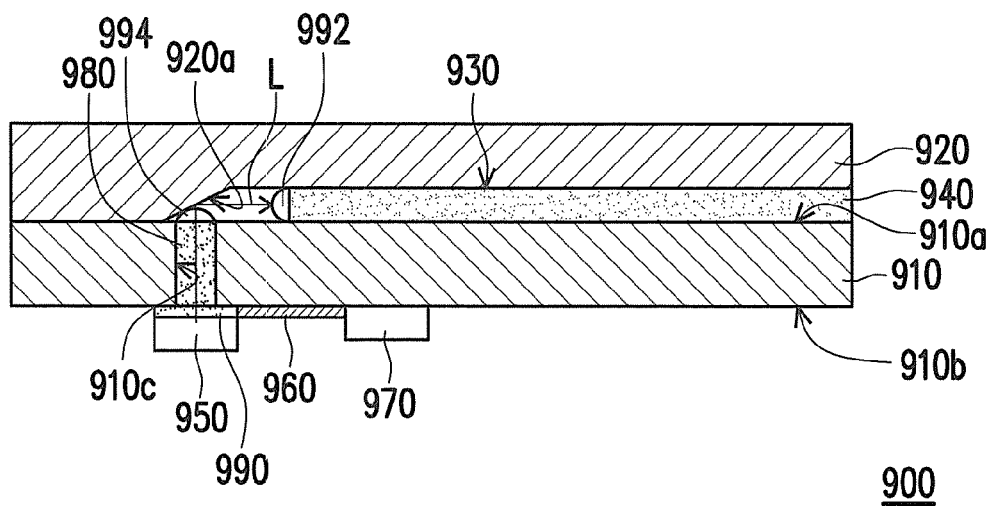
FIG. 20A is a cross-sectional view of an optical electrical element according to an embodiment of the invention.

FIG. 20A is a cross-sectional view of an optical electrical element according to an embodiment of the invention. Referring to FIG. 20A, an optical electrical module 900 includes a first substrate 910, a second substrate 920, a bearing portion 930, at least one light guide element 940, at least one optical electrical element 950, at least one conductive trace 960 and a driver 970. The second substrate 920 is combined with the first substrate 910. In detail, the first substrate 910 and the second substrate 920 are combined by the first positioning portion and the second positioning portion as shown in FIG. 11A, FIG. 11D, FIG. 12 or FIG. 13. The first substrate 910 has a first surface 910a facing the second substrate 920, a second surface 910b facing away from the second substrate 920 and a through hole 910c passing through the first surface 910a and the second surface 910b. The second substrate 920 has a reflective surface 920a facing the first substrate 910 and disposed in an optical path of the light signal L. In the embodiment of FIG. 20A, a material of the first substrate 810 and a material of the second substrate 820 are different. For example, the material of the first substrate 910 may be a ceramic, and the material of the second substrate 920 may be silicon, but the invention is not limited thereto. In other embodiments, a material of the first substrate 910 and a material of the second substrate 920 may be other suitable materials.

A bearing portion 930 is disposed between the first substrate 910 and the second substrate 920 to limit at least one light guide element 940. The practicable structure of the bearing portion 930 and the practicable structure of light guide element 940 are respectively the same with the bearing portion 222 and the light guide element 230 in FIG. 5A.

At least one optical electrical element 950 is disposed above the second surface 910b of the first substrate 910. Optical electrical element 950 covers at least a portion of the area on the second surface 910b of through hole 910c, in another embodiment of the invention, optical electrical element 950 may fully cover the area of through hole 910c. The optical electrical element 950 is configured for providing or receiving a light signal L passing through the light guide element 940, the reflective surface 920a and the through hole 910c. The optical electrical element 950 is a light-emitting element or a light-receiving element. The through hole 910c may be formed by using a laser to remove a portion of the first substrate 910 before forming the optical electrical element 950 above the second surface 910b of the first substrate 910, but the invention is not limited thereto.

At least one conductive trace 960 is disposed on the second surface 910b of the first substrate 910, and the term of "on the second surface 910b" means on the surface of the first substrate 910 or on a recess of the first substrate 910 (not showing in the figures). The optical electrical element 950 is bonding to the conductive trace 960 so as to be electrically connected to the conductive trace 960. In the embodiment of FIG. 20A, a material of the conductive trace 960 is but not limited to, metal, polysilicon, or silicon metal. A driver 970 is disposed on the second surface 910b of the first substrate 910 and is used for driving the optical electrical element 950. The first substrate 910 is located between the second substrate 920 and the driver 970. The driver 970 is bonding to the conductive trace 960 so as to be electrically connected to the conductive trace 960. The optical electrical element 950 and the driver 970 are electrically connected to each other by the conductive trace 960. The driver 950 may be a driving IC, a transimpedance amplifier (TIA) or a driving circuit.

The optical electrical module 900 may further includes a filler 980 filled in the through hole 910c of the first substrate 910. The light signal L further passes through the through hole 910c. An underfill 990 is formed between the optical electrical element 950 and the filler 980. The underfill 990 can fix the optical electrical element 950 to the first substrate 910 tightly so that the optical electrical element 950 is not be easily separated from the first substrate 910. In other word, the reliability of the optical electrical module 900 can be increased by the underfill 990.

The optical electrical module 900 further includes a first lens 992 disposed between the reflective surface 920a and the light guide element 940 and protruding toward the reflective surface 920a. The optical electrical module 900 further includes a second lens 994 disposed on the first surface 910a of the first substrate 910. The second lens 994 is located between the reflective surface 920a and the filler 980. The second lens 994 covers the through hole 910c and protrudes toward the second substrate 920. The filler 980, the underfill 990, the first lens 992, and the second lens 994 are optional.

Figure 20B:
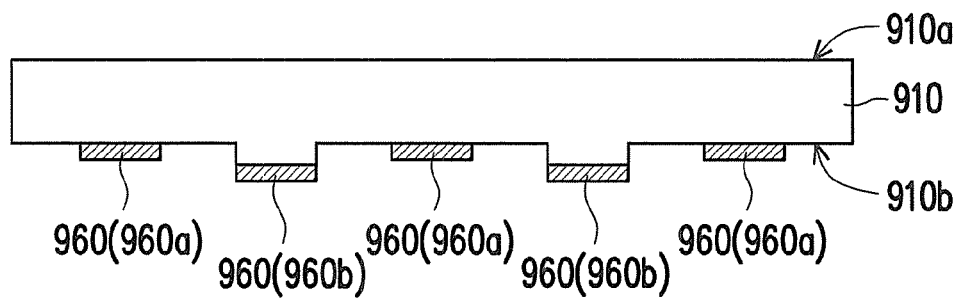
FIG. 20B is another embodiment of the invention showing the adjacent two conductive traces are arranged in the different plane.
Figure 20C:
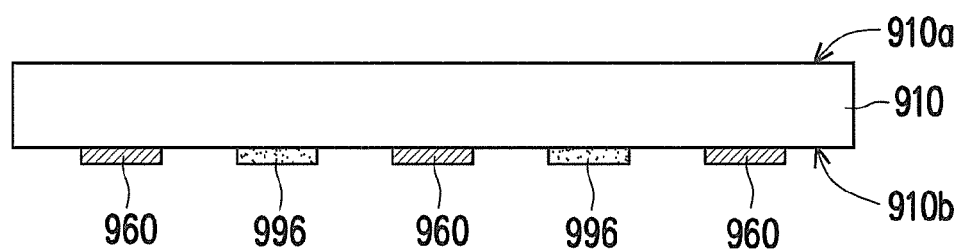
FIG. 20C is another embodiment of the invention showing the adjacent two conductive traces are separated by a shielding structure.

Specially, the conductive trace 960 is formed by a semiconductor process including an exposing step, a developing step and etching step so that a profile of the conductive trace 960 can be controlled precisely. That is benefit to the reduction of cross talk. FIG. 20B is another embodiment of the invention showing the adjacent two conductive traces 960a and 960b are arranged in the different plane, and such arrangement can further improve the effect preventing the adjacent two conductive traces from cross talk. In one embodiment of the invention, as showing in the FIG. 20B, the adjacent two conductive traces 960a and 960b are respectively disposed on a recess portion and a protrusion portion of the second surface 910b of the first substrate 910. In another embodiment of the invention, the second surface 910b is substantially flat, and conductive traces 960a are formed in the first substrate 910 or at least a portion thereof formed in the first substrate 910 and the adjacent conductive traces 960b are formed on the first substrate 910. FIG. 20C is another embodiment of the invention showing the adjacent two conductive traces 960 are separated by a shielding structure 996, which can provide positive effect to reduce cross talk between the two conductive trace 960. A material of the shielding trace 996 is but not limited to metal, polysilicon, or silicon metal.

In summary, in the optical electrical module of an embodiment of the invention, a surface contract area between the optical electrical element and the first substrate is large, so that the optical electrical element can be stably fixed on the first substrate, which improves reliability of the optical electrical module.

In the optical electrical module of another embodiment of the invention, the first substrate can be accurately and stably combined with the second substrate by using the first positioning portions of the first substrate and the second positioning portions of the second substrate, so as to improve the process robustness of the optical electrical module and decrease the fabrication cost thereof.

In an optical electrical module of still another embodiment of the invention, compared to the conventional technique, since a part of the light beam can be prevented from being reflected back to the optical electrical element by the light incident surface without processing the light incident surface of the light guide element into a slope oblique to the optical axis, the processing step of the light incident surface is omitted, and production efficiency of the optical electrical element is improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An optical electrical module, comprising:
    a first substrate;
    a second substrate, combined with the first substrate, wherein the first substrate has a first surface facing the second substrate, a second surface facing away from the second substrate and a through hole passing through the first surface and the second surface;
    a bearing portion, disposed between the first substrate and the second substrate to limit at least one light guide element;
    an insulation layer, disposed on the second surface of the first substrate;
    at least one optical electrical element, disposed on the insulation layer and covering at least a portion of the through hole, wherein the optical electrical element is configured for providing or receiving a light signal passing through the light guide element and the through hole;
    at least one conductive trace, disposed on the insulation layer; and
    a driver, disposed on the insulation layer, wherein the optical electrical element and the driver are electrically connected to each other by the conductive trace.

2. The optical electrical module as claimed in claim 1, wherein a material of the first substrate and a material of the second substrate are silicon.

3. The optical electrical module as claimed in claim 1, further comprising:
    a filler, filled in the through hole of the first substrate, wherein the light signal further passes through the filler.

4. The optical electrical module as claimed in claim 1, wherein an underfill is formed between the optical electrical element and the insulation layer.

5. The optical electrical module as claimed in claim 1, wherein the second substrate has a reflective surface facing the first substrate and disposed in an optical path of the light signal.

6. The optical electrical module as claimed in claim 5, further comprising:
    a first lens, disposed between the reflective surface and the light guide element and protruding toward the reflective surface.

7. The optical electrical module as claimed in claim 1, further comprising:
    a second lens, disposed on the first surface of the first substrate, wherein the second lens cover the through hole of the first substrate and protrudes toward the second substrate.

8. The optical electrical module as claimed in claim 1, further comprising two adjacent conductive traces disposed on different planes.

9. The optical electrical module as claimed in claim 1, further comprising two adjacent conductive traces separated by a shielding structure.

10. An optical electrical module, comprising:
    a first substrate having a first surface and a second surface opposite to the first surface;
    a second substrate facing the first surface of the first surface, combined with the first substrate and having a reflective surface facing the first substrate;
    a bearing portion, disposed between the first substrate and the second substrate to limit at least one light guide element; and
    at least one optical electrical element, disposed on a surface of the first substrate and facing the reflective surface, wherein the optical electrical element is configured for providing or receiving a light signal, and the reflective surface and the light guide element are disposed on an optical path of the light signal,
    wherein the first substrate has at least one first positioning portion, and the second substrate has at least one second positioning portion, the first positioning portion and the second positioning portion are combined to fix the light guide element between the first substrate and the second substrate, the first positioning portion is a groove and the second positioning portion is a bump, or the first positioning portion is the bump and the second positioning portion is the groove, the groove having a bottom surface and at least a groove side surface and the bump having a top surface and at least a bump side surface are formed through an etching process, and the groove and the bump are integrally formed with the first substrate or the second substrate.

11. The optical electrical module as claimed in claim 10, further comprising:
    an insulation layer, disposed on the second surface of the first substrate;
    at least one optical electrical element, disposed on the insulation layer and covering at least a portion of the through hole, wherein the optical electrical element is configured for providing or receiving a light signal passing through the light guide element, and the through hole;
    at least one conductive trace, disposed on the insulation layer; and
    a driver, disposed on the insulation layer, wherein the optical electrical element and the driver are electrically connected to each other by the conductive trace.

* * * * *